United States Patent
May et al.

(10) Patent No.: US 8,155,682 B2
(45) Date of Patent: Apr. 10, 2012

(54) HANDHELD ELECTRONIC DEVICE INCLUDING AUTOMATIC MOBILE PHONE NUMBER MANAGEMENT, AND ASSOCIATED METHOD

(75) Inventors: Darrell R. May, Waterloo (CA); Alain R. Gagne, Cambridge (CA); Kevin Sundberg, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1195 days.

(21) Appl. No.: 11/429,482

(22) Filed: May 5, 2006

(65) Prior Publication Data
US 2007/0274511 A1 Nov. 29, 2007

(51) Int. Cl.
*H04B 7/00* (2006.01)
(52) U.S. Cl. .................................. 455/514; 707/999.01
(58) Field of Classification Search .................. 455/418, 455/514; 707/999.01
See application file for complete search history.

(56) References Cited

U.S. PATENT DOCUMENTS

| | | | |
|---|---|---|---|
| 2002/0078075 A1* | 6/2002 | Colson et al. | 707/204 |
| 2002/0196922 A1* | 12/2002 | Marwell et al. | 379/218.01 |
| 2004/0225525 A1* | 11/2004 | Weitzman | 705/1 |
| 2004/0235523 A1* | 11/2004 | Schrire et al. | 455/558 |

FOREIGN PATENT DOCUMENTS

| | | |
|---|---|---|
| GB | 2 373 139 A | 9/2002 |
| WO | 99/57859 A | 11/1999 |
| WO | 2004/064432 A2 | 7/2004 |
| WO | 2006/021841 A2 | 3/2006 |

* cited by examiner

*Primary Examiner* — Marcos Batista

(57) ABSTRACT

A method of updating information included in a handheld device user's contact entry included in a global address list wherein the device stores information of a first type, such as a mobile phone, SMS or MMS number or a PIN. The method includes determining whether the information of a first type has been modified from a first stored piece of information to a second stored piece of information, and generating a message including the second stored piece of information and sending the message to a computer system of the organization if it is determined that the information of a first type has been modified. The computer system stores the second stored piece of information in response to receipt of the message by the computer system for subsequent access by a requesting party. Also provided is an improved handheld electronic device having one or more routines adapted to implement the method.

20 Claims, 3 Drawing Sheets

HANDHELD ELECTRONIC DEVICE INCLUDING AUTOMATIC MOBILE PHONE NUMBER MANAGEMENT, AND ASSOCIATED METHOD

BACKGROUND

1. Technical Field

The embodiments described herein relate generally to handheld electronic devices and, more particularly, to a handheld electronic device and associated method that provides for the automatic updating of a user's mobile phone number in an organization's global address list.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Examples of handheld electronic devices are included in U.S. Pat. Nos. 6,452,588 and 6,489,950.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

In addition, handheld electronic devices are often integrated with the computer systems of an organization with which the user of the handheld electronic device is associated. For example, the user may be an employee of a particular corporation, and that user's handheld electronic devices may be integrated with the computer systems of the employer corporation. In such cases, the user is typically able to use the handheld electronic device to access an electronic mail system that is operated by that organization to, for example, send and receive emails.

As is known in the art, most electronic mail systems maintain a global address list or book that includes and centralizes contact information for each user in the organization that has an account on the electronic mail system (the term "global addressed list or book" is used herein in a general sense, and is not meant to refer to any particular list or book that is maintained by a particular electronic mail system). In addition, most handheld electronic devices that are integrated with the computer system of an organization are provided with address lookup functionality that enables a user of the handheld electronic device to remotely access and search the global address list or book of the organization to obtain contact information for particular individuals. The contact information that is stored and available to users typically includes the office location (physical address), office phone number and email address of each individual. This enables a user to, for example, readily place a phone call or send an email to another member of the organization.

As is also known in the art, devices, such as handheld electronic devices, that include wireless functionality, such as telephone and data functionality, are provided with a subscriber identity module card (SIM card). A SIM card is a small printed circuit board/chip provided inside the device that contains subscriber details, including the user's mobile phone number and other data that identifies the user to a service provider, security information, and memory for a personal directory of numbers. The information contained inside a SIM card may be modified by a user, such as when the user obtains a new mobile phone number. This ability to change SIM card information, and in particular mobile phone number information, outside of the control of an organization with which the user is associated is one reason why mobile phone number information is typically not included in the global address list or book contact entries. It would be useful, however, for users to be able to reliably obtain an accurate, up to date mobile phone number from a global address list or book using the user's handheld electronic device. Thus, there is a need for an improved handheld electronic device that provides for the automatic updating of a user's mobile phone number in an organization's global address list.

BRIEF DESCRIPTION OF THE DRAWINGS

A full understanding of the invention can be gained from the following Description of the Preferred Embodiment when read in conjunction with the accompanying drawings in which.

DESCRIPTION OF THE PREFERRED EMBODIMENTS

A method of automatically updating information included in a selected contact entry included in a global list of contact entries maintained by an organization, such as a corporate employer, is provided wherein the selected contact entry is the contact entry of a user of a handheld electronic device. The device includes memory media, such as a SIM card, that stores information of a first type, such as a mobile phone number, a PIN, an SMS number or an MMS number. The method includes determining whether the information of a first type has been modified from a first stored piece of information (such as an old mobile phone number, PIN, SMS number or MMS number) to a second stored piece of information (such as new mobile phone number, PIN, SMS number or MMS number), and generating a message including the second stored piece of information and sending the message to a computer system of the organization if it is determined that the information of a first type has been modified. The computer system stores the second stored piece of information for subsequent access by a requesting party, such as a party seeking information from the global list of contact entries. The selected contact entry may be updated to include the second stored piece of information in response to receipt of the message by the computer system. Alternatively, the second stored piece of information may be stored in a separate table for later access. Also provided is an improved handheld electronic device having one or more routines adapted to implement the method described above.

Figure 1:
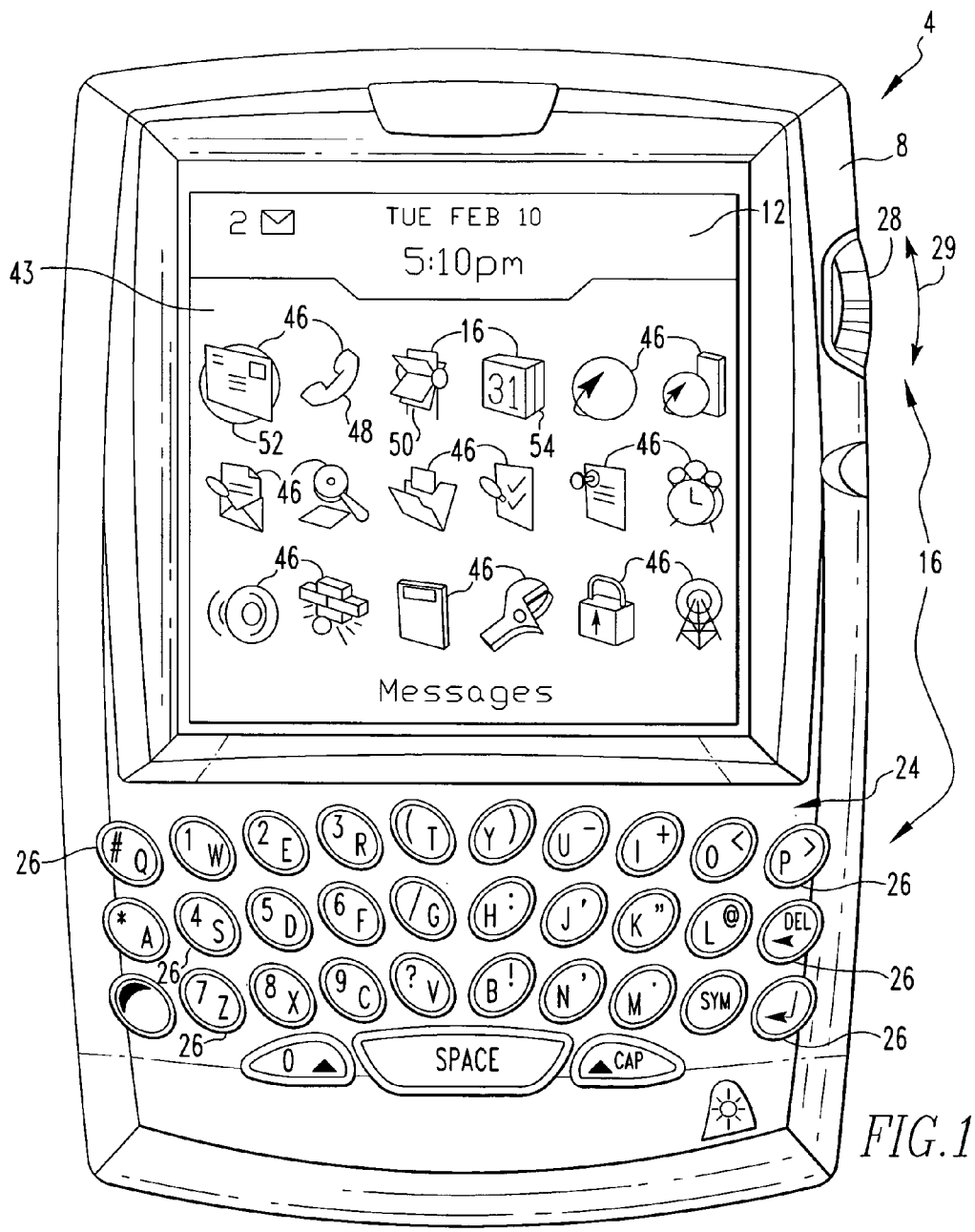
FIG. 1 is a front view of an improved handheld electronic device according to one embodiment.
Figure 2:
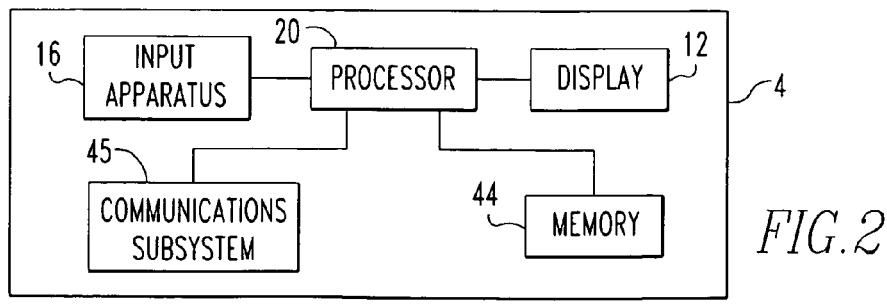
FIG. 2 is a block diagram of the handheld electronic device of FIG. 1.

An improved handheld electronic device 4 in accordance with one embodiment is depicted generally in FIGS. 1 and 2.

The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. The handheld electronic device 4 is of a type that includes a wireless telephone capability and, as such, includes a SIM card as described below.

As can be understood from FIG. 1, the input apparatus 16 includes a keyboard 24 having a plurality of keys 26, and a rotatable trackwheel 28. As used herein, the expression "key" and variations thereof shall refer broadly to any of a variety of input members such as buttons, switches, and the like without limitation. The keys 26 and the rotatable trackwheel 28 are input members of the input apparatus 16, and each of the input members has a function assigned thereto.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" as used herein shall refer to and include one or more routines, subroutines, function calls or the like, alone or in combination.

As is also shown in FIG. 2, processor 20 is in electronic communication with communications subsystem 45. Communications functions for handheld electronic device 4, including data and voice communications (wireless telephone), are performed through communications subsystem 45. Communications subsystem 45 includes a transmitter and a receiver (possibly combined in a single transceiver component), a SIM card, and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobitex™, DataTAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4.

In FIG. 1, the display 12 is depicted as displaying a home screen 43 that includes a number of applications depicted as discrete icons 46, including, without limitation, an icon representing a phone application 48, an address book application 50, a messaging application 52 which includes email, SMS and MMS applications, and a calendar application 54. In FIG. 1, the home screen 43 is currently active and would constitute a portion of an application. Other applications, such as phone application 48, address book application 50, messaging application 52, and calendar application 54 can be initiated from the home screen 43 by providing an input through the input apparatus 16, such as by rotating the thumbwheel 28 and providing a selection input by translating the trackwheel 28 in the direction indicated by the arrow 29 in FIG. 1.

Figure 3:
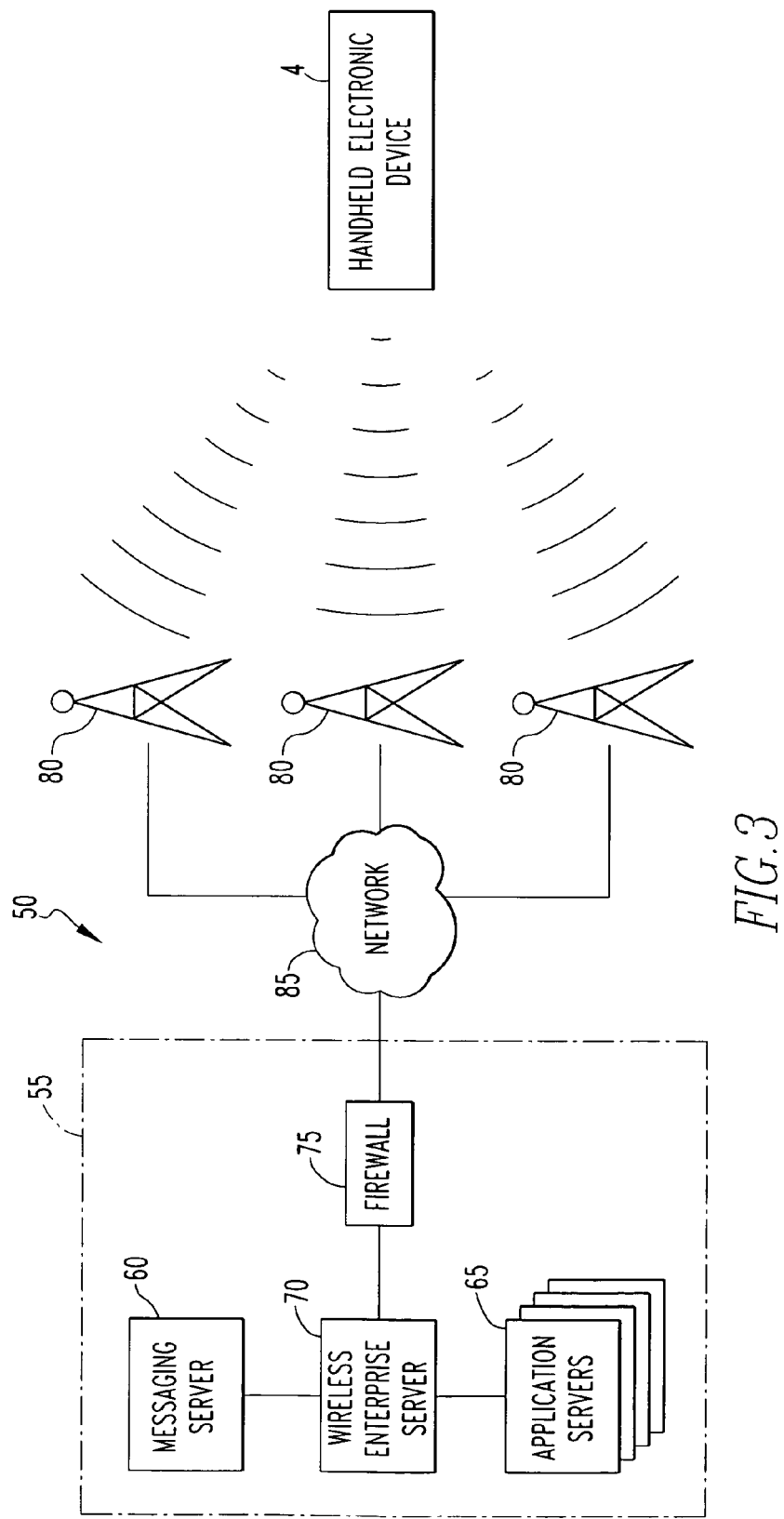
FIG. 3 is a block diagram of a system in which the handheld electronic device shown in FIGS. 1 and 2 may be integrated with the computer systems of an organization with which the user of the handheld electronic device is associated.

FIG. 3 is a block diagram of a system 50 in which the handheld electronic device 4 may be integrated with the computer systems of an organization with which the user of the handheld electronic device 4 is associated, such as the user's employer. The system 50 includes an organization location 55 that includes a messaging server 60, one or more application servers 65, and a wireless enterprise server 70. The messaging server 60, among other things, implements an electronic mail system for the organization, and may be, for example, the IBM® Lotus® Domino® messaging server or the Microsoft® Exchange messaging server. In addition, the messaging server 60 maintains a global address list or book for the organization that includes contact information for each member of the organization that has an email account. The one or more application servers 65 may include servers for implementing any number of various applications used by the organization such as, for example and without limitation, a web server or an application server that implements a CRM system for the organization. The wireless enterprise server 70, which is provided behind an organization firewall 75, integrates with the messaging server 60 and the application servers 65 and enables various wireless devices, such as the handheld electronic device 4, to gain remote access the messaging server 60 and the application servers 65. In particular, as seen in FIG. 3, the handheld electronic device 4 is, in a known manner, able to gain remote access to the messaging server 60 and the application servers 65 through one or more wireless networks 80 that are connected to a network 85, such as the Internet, each of which is part of the system 50 shown in FIG. 3. As a result, the handheld electronic device 4 is able to access the organization's electronic mail system that is implemented by the messaging server 60 to send and receive email messages. The handheld electronic device 4 is also able to access the organization's global address list to obtain contact information for selected members of the organization. While FIG. 3 shows the messaging server 60, the one or more application servers 65, and the wireless enterprise server 70 as separate components for illustrative purposes, it should be understood that such servers may each be a separate software server with two or more (possibly all) of them being housed on the same computing device (e.g., server computer), or, alternatively, may each be a separate software server with each housed on a separate computing device (e.g., server computer).

Figure 4:
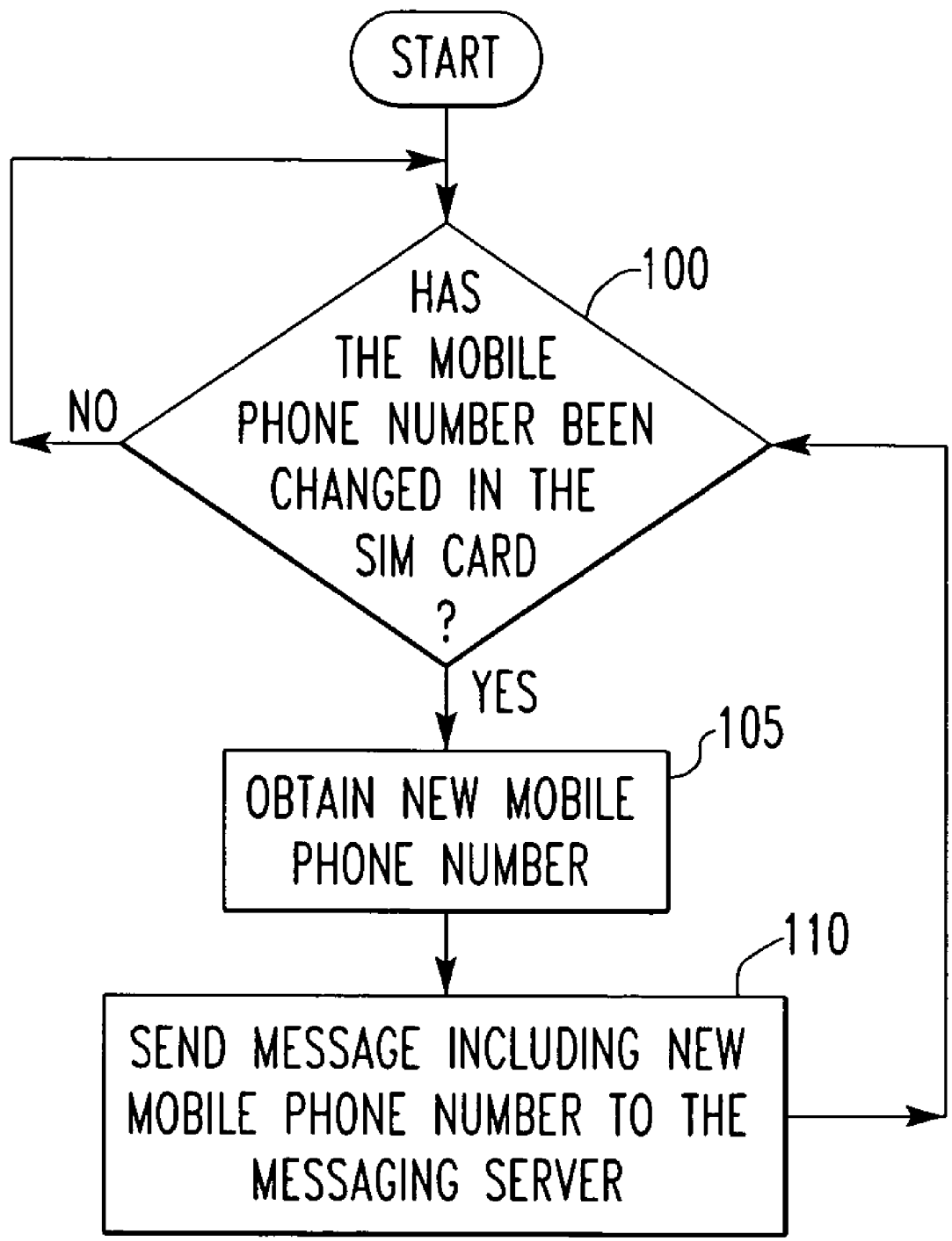
FIG. 4 is a flowchart illustrating an embodiment of a routine performed by the processor of the handheld electronic device shown in FIGS. 1 and 2 for automatically updating of a user's mobile phone number in a global address list.

FIG. 4 is a flowchart illustrating an embodiment of a routine performed by the processor 20 of the handheld electronic device 4 for automatically updating of a user's mobile phone number in the organization's global address list that is maintained by the messaging server 60. The routine begins at step 100, where the processor 20 monitors the SIM card of the handheld electronic device 4 and determines whether the mobile phone number stored by the SIM card has been changed. If the answer is no, then the routine returns to step 100 so that the monitoring can continue. If the answer is yes, then at step 105, the processor 20 obtains the new mobile number from the SIM card. Next, at step 110, the processor 20 generates a message that identifies the user and contains the new mobile phone number and causes the message to be securely sent to the messaging server 60 through one or more of the wireless networks 80 and the network 85. The message may be sent in any number of ways, such as, without limitation, SOAP over HTTPS, SMIME, or a customer transport protocol. When the messaging server 60 receives the message, it will update the contact entry for the user that is contained in the organization's global address list so that the contact entry for the user will include the new (current) mobile phone number. Alternatively, rather than updating the organization's global address list, which may not be desirable for security reasons, the messaging server 60 or the wireless enterprise server 70 may store the new mobile phone number contained in the message in a separate table in association with the name of the user so that the information may later be accessed by a requesting party, such as a party that is attempting to access the organization's global address list.

As mentioned elsewhere herein, SIM cards may store a number of different items of information relating to the user in addition to the user's mobile phone number. In some cases, one or more of those items of information are able to be stored in an organization's global address list or book. However, because those items reside on the SIM card and are subject to change, they present the same problem that a mobile phone number presents, namely that the global address list or book may not always be up to date. These additional items may include a personal identification number (PIN) that uniquely identifies a handheld electronic device on a network and, as is known, may be used to send messages (called PIN messages) to the handheld electronic device through the network (and outside of the user's existing email account). These additional items may also include an SMS or MMS number that, for some reason, is different than the user's mobile phone number, or the IMEI (International Mobile Equipment Identity) number for the handheld electronic device 4. Thus, in alternative embodiment, changes in those items of information are monitored by the processor 20 of the handheld electronic device, and when changes are made, the new information is sent to the messaging server 60 so that the global address list can be updated accordingly. In addition, the information described herein as being stored by the SIM card may, alternatively, be stored in any type of memory media, such as, without limitation, internal flash memory or an embedded ISO smart card, provided with the handheld electronic device 4. Thus, that memory may be substituted for the SIM card in the method described herein.

While preferred embodiments have been described and illustrated above, it should be understood that these are exemplary and are not to be considered as limiting. Additions, deletions, substitutions, and other modifications can be made without departing from the spirit or scope hereof. Accordingly, the invention is not to be considered as limited by the foregoing description but is only limited by the scope of the appended claims.

What is claimed is:

1. A method of updating information included in a selected contact entry included in a global list of contact entries maintained by an organization, the selected contact entry being for a user of a handheld electronic device, the handheld electronic device storing information that uniquely identifies the handheld electronic device on a network, the selected contact entry being able to include the information, comprising:
   determining whether the information stored by the handheld electronic device that uniquely identifies the handheld electronic device on the network has been modified from a first stored piece of information to a second stored piece of information; and
   generating a message including the second stored piece of information and sending the message to a computer system of the organization if it is determined that the information stored by the handheld electronic device that uniquely identifies the handheld electronic device on the network has been modified, wherein the computer system stores the second stored piece of information for subsequent access by a requesting party by storing the second stored piece of information in a table in association with the user, the table being separate from the global list of contact entries, rather than updating the global list of contact entries.

2. The method according to claim 1, wherein the handheld electronic device includes a SIM card, and wherein the SIM card stores the information that uniquely identifies the handheld electronic device on the network.

3. The method according to claim 1, wherein the information that uniquely identifies the handheld electronic device on the network is a mobile phone number, wherein the first stored piece of information is an old mobile phone number for the user and the second stored piece of information is a new mobile phone number for the user.

4. The method according to claim 1, wherein the information that uniquely identifies the handheld electronic device on the network is a PIN, wherein the first stored piece of information is an old PIN for the user and the second stored piece of information is a new PIN for the user.

5. The method according to claim 1, wherein the information that uniquely identifies the handheld electronic device on the network is an SMS number, wherein the first stored piece of information is an old SMS number for the user and the second stored piece of information is a new SMS number for the user.

6. The method according to claim 1, wherein the information that uniquely identifies the handheld electronic device on the network is an MMS number, wherein the first stored piece of information is an old MMS number for the user and the second stored piece of information is a new MMS number for the user.

7. The method according to claim 1, wherein the computer system includes a messaging server, and wherein the global list of contact entries is maintained by the messaging server.

8. The method according to claim 7, wherein sending the message to a computer system of the organization includes sending the message to the messaging server.

9. The method according to claim 7, wherein the computer system includes a wireless enterprise server coupled to the messaging server and a firewall, and wherein the message to the computer system of the organization includes sending the message to the messaging server through the firewall and the wireless enterprise server.

10. The method according to claim 7, wherein the messaging server implements an electronic mail system, and wherein the global list of contact entries includes contact information for each member of the organization that has an email account in the electronic mail system.

11. A system, comprising:
   a handheld electronic device; and
   a computer system maintained by an organization associated with a user of the handheld electronic device, the organization maintaining a global list of contact entries;
   the handheld electronic device, comprising:
      a processor; and
      one or more memory media in electronic communication with the processor, the one or more memory media storing information that uniquely identifies the handheld electronic device on a network, the information being of a type that may be stored in the global list of contact entries, the one or more memory media further storing one or more routines executable by the processor, the one or more routines being adapted to:
   determine whether the information stored by the one or more memory media that uniquely identifies the handheld electronic device on the network has been modified from a first stored piece of information to a second stored piece of information; and generate a message including the second stored piece of information and send the message to the computer system if it is determined that the information stored by the one or more memory media that uniquely identifies the handheld electronic device on the network has been modified;

wherein the computer system stores the second stored piece of information for subsequent access by a requesting party by storing the second stored piece of information in a table in association with the user, the table being separate from the global list of contact entries, rather than updating the global list of contact entries.

12. The system according to claim 11, wherein the one or more memory media includes a SIM card, and wherein the SIM card stores the information that uniquely identifies the handheld electronic device on the network.

13. The system according to claim 11, wherein the information that uniquely identifies the handheld electronic device on the network is a mobile phone number, wherein the first stored piece of information is an old mobile phone number for the user and the second stored piece of information is a new mobile phone number for the user.

14. The system according to claim 11, wherein the information that uniquely identifies the handheld electronic device on the network is a PIN, wherein the first stored piece of information is an old PIN for the user and the second stored piece of information is a new PIN for the user.

15. The system according to claim 11, wherein the information that uniquely identifies the handheld electronic device on the network is an SMS number, wherein the first stored piece of information is an old SMS number for the user and the second stored piece of information is a new SMS number for the user.

16. The system according to claim 11, wherein the information that uniquely identifies the handheld electronic device on the network is an MMS number, wherein the first stored piece of information is an old MMS number for the user and the second stored piece of information is a new MMS number for the user.

17. The system according to claim 11, wherein the computer system includes a messaging server, and wherein the global list of contact entries is maintained by the messaging server.

18. The system according to claim 17, wherein the computer system includes a wireless enterprise server coupled to the messaging server and a firewall, and wherein the one or more routines are adapted to send the message to the messaging server through the firewall and the wireless enterprise server.

19. The system according to claim 17, wherein the messaging server implements an electronic mail system, and wherein the global list of contact entries includes contact information for each member of the organization that has an email account in the electronic mail system.

20. The system according to claim 11, wherein the one or more routines are adapted to send the message to the messaging server.

* * * * *